United States Patent [19]
Durham, Jr.

[11] 3,739,513
[45] June 19, 1973

[54] FISHING FLOAT

[76] Inventor: George M. Durham, Jr., 6931 Luck, Dallas, Tex. 75217

[22] Filed: Oct. 26, 1970

[21] Appl. No.: 83,785

[52] U.S. Cl. .................................................. 43/17
[51] Int. Cl. ........................ A01k 93/00, A01k 97/12
[58] Field of Search ............... 43/17, 44.83, 17.5

[56] References Cited
UNITED STATES PATENTS

| | | | |
|---|---|---|---|
| 2,150,644 | 3/1939 | Batcheller | 43/17 UX |
| 2,490,669 | 12/1949 | Burke | 43/17 |
| 2,476,633 | 7/1949 | Sohr | 43/17 |
| 2,153,750 | 4/1939 | Goertzen | 43/17 |
| 2,255,959 | 9/1941 | Barber | 43/17 |
| 754,892 | 3/1904 | Robbins | 43/44.83 |

*Primary Examiner*—Hugh R. Chamblee
*Assistant Examiner*—Daniel J. Leach
*Attorney*—Marcus L. Bates

[57] ABSTRACT

A fishing float associated with a fishing line comprising a hollow body in which is disposed a battery, a bulb, and a shaft. The shaft is formed at its interior end as a spiral spring which encloses a marginal end of the battery and engages the bulb in a manner to space the end of the bulb from the battery. The other end of the shaft extends through a seal member to the exterior of the float and has means thereon for connecting the fishing line thereto. A pull on the line moves the shaft to move the bulb into contact with the battery to light the bulb and signal the bite of a fish.

10 Claims, 9 Drawing Figures

PATENTED JUN 19 1973 3,739,513
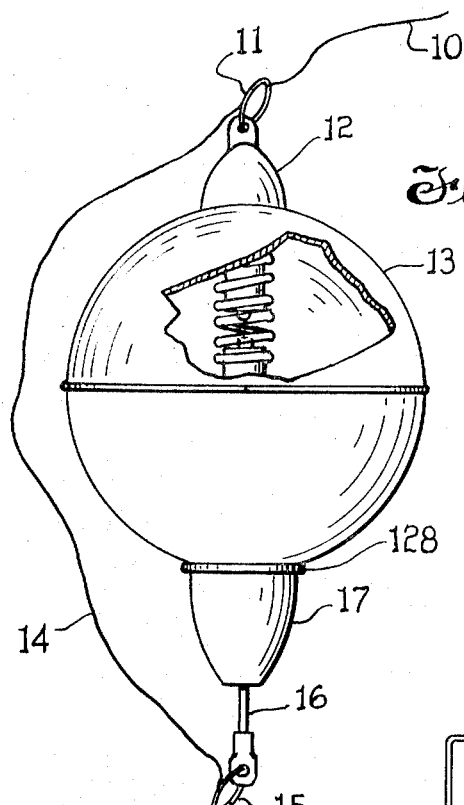
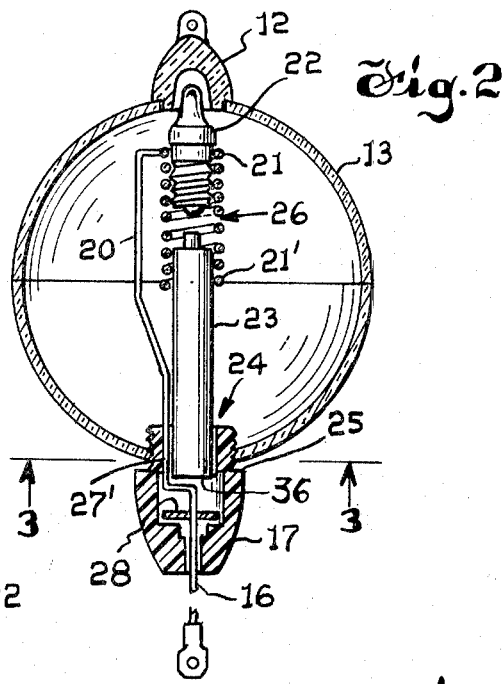
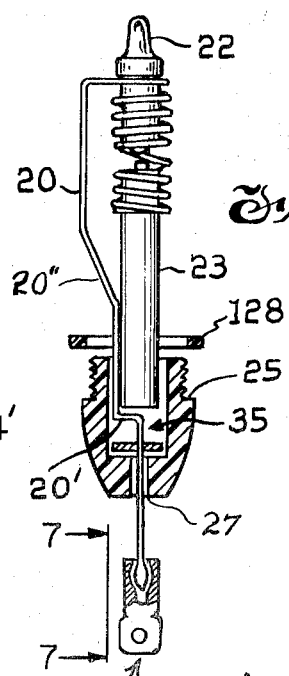
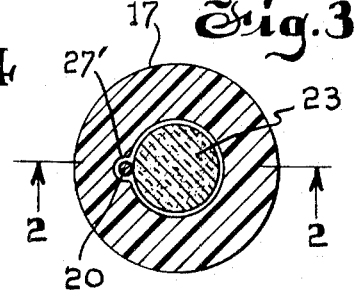
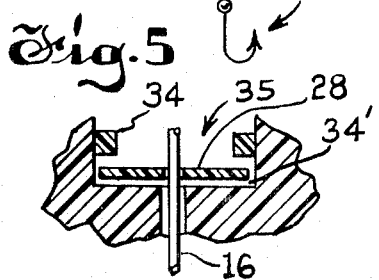
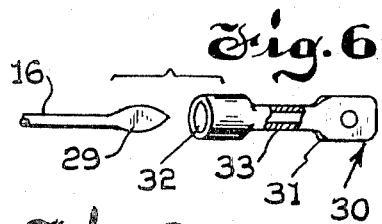
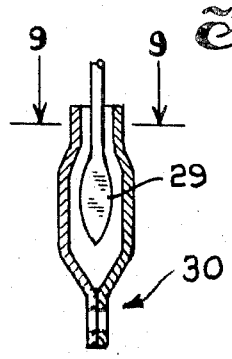
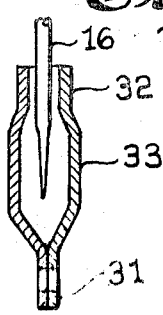
INVENTOR
GEORGE M. DURHAM, JR.
MARCUS L. BATES
HIS AGENT

FISHING FLOAT

BACKGROUND OF THE INVENTION

Historically, with the passage of time, fish change in their habits very little, yet the method and apparatus by which fish may be caught has drastically changed within the last decade. Until just a few years ago fishing floats were made exclusively of cork or wood and the inexpensive polyethylene floats which could be mass produced by injection molding was unknown. A modern fish line the size of a straight pin will hold a twenty pound fish, yet until recently a line having this same tensile strength would of necessity be the size of one's shoe lace. Recent technology offers miniaturized accessories, such as bulbs and batteries, which are vastly superior to the prior art.

It is desirable to be able to fabricate a compact fishing float which takes advantage of modern technology. The float should be of a size and configuration to be easily fitted into the modern tackle box, durable and low in cost, and should be provided with means by which it will become illuminated when activated by a fish. It is further desirable that the float be compatible with modern fishing lines, lures, and rods; and can be hermetically sealed in a manner to permit subsequent repair or replacement of parts. It is also desirable that such an improvement in illuminated floats have associated therewith a minimum of parts so as to simplify its construction as well as providing low cost, trouble free operation.

SUMMARY OF THE INVENTION

This invention comprehends the fabrication of an illuminated fishing float for attachment to a fishing line and lure comprising a hollow plastic body which will float in water and which further includes a seal member removably attached to the body, with another member in the form of a dome being diametrically opposed to the seal member. Attached to the seal member and disposed within the body of the float is a battery, a spiral spring, and a miniature bulb. The bulb is threadedly engaged to a marginal end portion of the coiled spring and the battery is threadedly secured to the opposite marginal coiled portion of the spring so that the bulb, battery, and spring are coaxially aligned with one another within the float body. The center contact of the bulb is slightly spaced apart from the center contact of the battery thereby forming a normally open switch means.

The seal member includes a rubber wafer which serves as a diaphragm through which there sealingly extends an actuator shaft having a free terminal end portion removably affixed to a fastener means. The shaft is a continuation of the upper marginal end of the wire which forms the coil spring. Accordingly, when the shaft is placed in tension, the bulb is biased toward the battery to thereby complete the circuitry from the battery, through the spring, through the filament of the bulb, and back to the central terminal of the battery, thereby causing the bulb to become illuminated.

The rubber wafer of the seal member is provided with a needle like puncture through which the shaft forcibly depends so as to provide a diaphragm which hermetically seals the interior of the float and which flexes so as to enable movement of the shaft relative to the hollow body of the float.

BRIEF DESCRIPTION OF THE DRAWINGS

FIG. 1 is a front elevational view of a float fabricated according to the present invention, with part of the hollow body being removed so as to show the arrangement of some of the parts therewithin;

FIG. 2 is a longitudinal cross-sectional view of the float seen in FIG. 1, with some parts thereof being unsectioned so as to more clearly illustrate the cooperative relationship therebetween;

FIG. 3 is an enlarged cross-sectional view taken along line 3—3 of FIG. 2;

FIG. 4 is a part cross-sectional view of some of the parts seen in FIG. 2;

FIG. 5 is an enlarged, fragmentary, partly cross-sectional view of another arrangement of some of the parts seen in the foregoing figures;

FIG. 6 is an enlarged, fragmentary, partly-cross sectional exploded view of part of the apparatus seen in FIG. 4;

FIG. 7 is an enlarged cross-sectional view taken along line 7—7 of FIG. 4;

FIG. 8 is a cross-sectional view similar to FIG. 7; and

FIG. 9 is a cross-sectional view taken along line 9—9 of FIG. 7.

DETAILED DESCRIPTION OF THE PREFERRED EMBODIMENT

FIG. 1 shows a fishing float made in accordance with the present invention. The float is attached to a fishing line 10 by spiral ring 11 which has been placed through an eyelet located within the transparent dome 12. The dome is attached to a hollow plastic body 13 and preferably is an integral part of the structure forming the hollow body. Line 14 is preferably loosely connected to ring 15, which may be identical to ring 11, with the ring being fitted into the illustrated eyelet which telescopically receives the free depending end of shaft 16. The shaft freely depends from a seal member 17. Line 18, which can be a continuation of line 10 and 14, is attached to a weighted lure 19. The lure can take on any number of different forms.

Lever or shaft 20 is a continuation of shaft 16 and is bent horizontally at 20' and at an angle at 20''. At 21 the lever is bent to form a coil or spring. The coil is of a diameter and pitch which permits the threaded base of a light bulb 22 to be threadedly received therewith. The light bulb naturally has a filament therewithin. The coil continues as seen at 21' in FIG. 2 and forcibly receives the upper marginal end portion of battery 23 in close fitting tolerance therewithin. Hence, the coil makes electrical contact with the case or exterior surface of the battery. The base or lower marginal end portion of the battery is force-fitted into the illustrated cavity of seal member 17 so as to firmly anchor and support the battery within the cavity in a manner indicated by the arrow at numeral 24.

The arrow at numeral 26 illustrates that the central bulb terminal (or central electrical contact) is normally open, or spaced apart from the central terminal (or electrical contact) of the battery.

The seal member is apertured at 27 so as to provide a bearing surface in the form of a passageway for reciprocatingly receiving an intermediate straight marginal vertical portion of the shaft. The rubber wafer 28 is provided with a central aperture in the form of a puncture which facilitates insertion of the enlarged end portion 29 therethrough. The free end portion of the shaft is forced through the puncture and is received in close tolerance relationship therewithin to form a seal. This arrangement of parts hermetically seals the interior of the float and precludes leakage of moisture thereinto.

A fastener 30 cooperates with flattened portion 29 of the shaft to permit removal of the fastener therefrom. The fastener includes a flattened end 31 having an aperture therein for receiving the before mentioned ring 15 therethrough. A second partially flattened or deformed end 32 permits flattened portion 29 of the shaft to be telescopically inserted therethrough. Central portion 33 is of a constant diameter. Portion 32 can be telescopingly received in a reciprocating manner within aperture 27, if desired.

As seen in FIG. 5, a do-nut shaped piece of plastic 34 can be forced against the outer periphery of the wafer to sealingly press the wafer against the bottom of cavity 35. Alternatively, do-nut 34 can be an integral part of seal member 17 and spaced closely adjacent the wafer in order to form annulus 34'. Annulus 34' receives the outer peripheral marginal edge portion of the wafer in sealing relationship therewithin.

One method by which spring 21 can be fabricated is to wind the spiral portion, leaving an elongated straight depending end portion. The depending end is bent from a horizontal to a vertical position 20, then given an inclined bend 20'', followed by a second horizontal bend 20' and a second vertical bend to provide shaft 16. The completed spring is best viewed in its entirety by referring to either of FIGS. 2 or 4.

The battery and bulb are next mated to the marginal free ends of the spring by merely screwing or forcing the spring over an uninsulated terminal end portion of the battery. The bulb 22 is screwed into a position which leaves the central electrical terminal of the battery and the bulb spaced apart from one another a minute amount as seen in the exaggerated illustration at the arrow identified by numeral 26.

Wafer 28 is punctured with a needle and carefully guided over enlargement 29 and into the relative position of FIG. 4. Washer 128 (FIG. 4) is placed on shoulder 25, and then the battery is forced into the cavity of the seal member, care being taken to align each vertical portion of the shaft with apertures 27 and 27'.

End member 30 is next attached to the enlarged portion 29 by merely aligning the members in the manner of FIG. 8. Member 30 is then rotated 90° to achieve the configuration seen in FIGS. 4 and 7. The completely assembled apparatus of FIG. 4 is next screwed into the lower extremity of the housing and the light bulb is received within the illustrated cavity of dome 12.

In operation, line 10 is attached to a fishing pole, rod or other suitable fishing line holding device, through spiral ring 11, around the housing and through spiral ring 15, and lastly attached to a fish hook. Any type lure can be used at 19 and the line 18 can be of any desired length. The entire apparatus floats with most of the illustrated structure above water level because of its buoyancy.

A fish, upon contacting the lure, will cause movement of the shaft which in turn will move the bulb against the spring biasing means, causing the normally open contacts at 26 to close and accordingly complete the electric circuitry. Current flows from the battery, through the contacts at 26 into the filament of the bulb, from the filament of the bulb into its threaded base and back through the spring to the outer metallic housing of the battery. As soon as the downward force is removed the spring again opens the contacts. Therefore, a fish nibbling at the lure will cause a series of erratic flashes from the electric bulb.

Since the movement required to complete the circuitry is extremely small, deformation of the wafer is of a magnitude which requires no relative motion between the shaft and the pinhole formed in the wafer. Instead, the wafer acts as a diaphragm with movement or flexing occurring along the intermediate circumferential area thereof.

It should be noted that the wafer and the base of the battery provide spaced apart opposed stop means between which the horizontal bend at 20' can abut should an undue force be placed on the fastener 30. The sloped portion 20'' will bend like a spring which prevents injury to the apparatus should the horizontal portion be forced into engagement with the wafer. Moreover, when sufficient tension is applied at 18 the slack will disappear at 14 since the line is slidably received through the spiral rings at 11 and 15.

It is preferable to fabricate the upper and lower hemispheres forming the hollow body of different colored plastics with the dome 12 being made of clear plastic so as to provide an attractive illuminated fishing float which is visible from a considerable distance. For example, the upper half of the dome can be red, the lower half blue, and the dome 12 of clear transparent material which will enable the fishing float to be used as a flashlight at night by merely pulling on the shaft. The apparatus can be left in the tackle box in its standby configuration until needed for fishing. Modern leakproof batteries exhibit an unusual long shelf life and enable storage of the float in a tackle box for long periods of time. Since the bulb is loosely supported within the dome cavity, the battery secured within the seal means, and a spring disposed therebetween, the resultant mechanism is rugged and will survive a considerable amount of abuse.

Disassembly of the fishing float is accomplished by reversing the above outlined assembly procedure.

I claim:

1. A fishing float assembly for attachment to a fishing line comprising:

means forming a hollow body which will float in water, means forming a seal member, said seal member being removably attached to said body; a battery, a bulb, and a shaft; said shaft extending from the interior of said hollow body, through said seal member, and having a free end depending away from said hollow body;

means affixing said battery to said seal member; said battery having an exterior surface which forms one electrical terminal and a central terminal which forms another electrical terminal; said bulb having a first terminal in the form of a screw thread and a second terminal centrally disposed with respect to the first terminal; a filament electrically connected to said first and second terminals;

a spiral spring means, a portion of said spring means adapted to enclose a marginal end of said battery, another portion of said spring means adapted to engage said screw thread of said bulb so as to resiliently mount said bulb with said second terminal thereof normally being spaced apart from but closely adjacent to said central terminal of said battery;

means by which said shaft is connected to move said bulb against the biasing action of said spring whereby;

a line connected to the terminal end of said shaft moves the shaft to thereby cause the second bulb terminal to contact the central battery terminal, whereupon current flows through the battery, into the spring, into the screw thread, through the bulb filament, to the second contact of the bulb, and to the central battery terminal to thereby enable the float to be illuminated.

2. The improvement of claim 1 wherein said shaft is an integral part of said spring.

3. The improvement of claim 1 wherein said shaft is a continuation of said spring;

said shaft extending horizontally from said spring, where it is bent vertically downward for a limited distance, whereupon it is bent towards said battery and then bent back into a vertical plane which places the spring closely adjacent to the battery, said spring next being bent horizontally and again vertically with the last vertical portion of the spring including the free terminal end thereof.

4. The improvement of claim 1 wherein the free terminal end of said shaft is flattened, a fastener means adapted to engage the marginal terminal end of said shaft, said fastener having a constant diameter portion, a flattened portion through which there is formed an eyelet, a deformed portion for receiving the terminal end of said shaft therethrough, with the two flattened portions being spaced apart from each other by said constant diameter portion.

5. The improvement of claim 1 wherein said hollow body includes a dome affixed thereto, said dome and said seal member are diametrically opposed to one another;

said dome having means forming a cavity therein which enables said bulb to be slidably and telescopically received therein so as to position the bulb within the interior of said hollow body.

6. The improvement of claim 1 wherein said seal means includes a wafer, a first counterbore, and a second counterbore;

said first counterbore being of a diameter which forcibly receives a marginal portion of said battery therein, said wafer underlying said battery;

the second counterbore being smaller in diameter than the first said counterbore so as to form a shoulder against which said wafer may be secured; said shaft being slidably received by the last counterbore, and depending through said wafer.

7. The fishing float assembly of claim 1 wherein said shaft and said spring are formed from one continuous and integral piece of wire;

one marginal free end of said wire forming said spring and the remaining marginal free end of said wire forming said shaft.

8. The fishing float assembly of claim 1 wherein said shaft and said spring are integrally formed together from a single elongated piece of metal;

said shaft being a continuation of the spring portion which is connected to said bulb;

said portion of said spring means which is adapted to enclose a marginal end of said battery includes a terminal end portion of said elongated piece of metal.

9. The fishing float assembly of claim 1 wherein said spiral spring means and said shaft are a continuous piece of metal, with the spring having a terminal end portion which terminates in coiled relationship about the battery, and with the shaft being a portion of said continuous piece of metal which depends from said portion of said spring which is coiled about said bulb.

10. The fishing float assembly of claim 1 wherein said hollow body includes a dome affixed to the upper marginal end portion thereof, said dome and said seal member being located in opposed relationship respective to one another;

said spiral spring means and said shaft are a continuous piece of metal, with the spring having a terminal end portion which terminates in coiled relationship about the battery, and with the shaft being a portion of said continuous piece of metal which depends from said portion of said spring which is coiled about said bulb;

said seal means includes a wafer, a first counterbore, and a second counterbore;

said first counterbore being of a diameter which forcibly receives a marginal portion of said battery therein, said wafer underlying said battery;

the second counterbore being smaller in diameter than the first said counterbore so as to form a shoulder against which said wafer may be secured; said shaft being slidably received by the last counterbore, and depending through said wafer.

* * * * *